3,514,700
> ## VOLTAGE RATIO COMPUTER
> Walter F. Kalin, Fairport, and Richard L. Mitchell, Rochester, N.Y., assignors to Sybron Corporation, a corporation of New York
> Filed May 15, 1967, Ser. No. 638,494
> Int. Cl. G01r 7/04; G06g 7/16
> U.S. Cl. 324—140                   7 Claims

ABSTRACT OF THE DISCLOSURE

A first input voltage is applied across a pair of resistances in series, the voltage at the junction of the resistors being used to vary the drain to source resistance of a field effect transistor forming part of one of said pair of resistances, the FET's drain to source resistance being caused to vary so as to make the last said voltage assume a predetermined value. The first input voltage is then replaced by a second input voltage, while the resistance of the FET is maintained at the value it took when the first input voltage was applied across the pair of resistance, and accordingly the voltage at the junction of the resistances becomes a measure of the ratio of the second input voltage to the first input voltage.

---

This application relates to subject matter disclosed in application Ser. No. 615,422, of Richard L. Mitchell, filed Feb. 13, 1967, entitled, "Material Parameter Measurement Using EM Radiation," and assigned to the assignee of the present application.

This invention relates to computing ratios, and is based on the well-known principle that if a voltage is applied across a resistance at least some part of which is varied so that the voltage at a given point on the resistance assumes some predetermined value, then if the first voltage is replaced by a second voltage, the voltage at the given point is a function of the predetermined value and of the ratio of the second voltage to the first voltage (supposing the latter not to have changed in the meantime). In the prior art, the resistance is customarily a potentiometer whose slider is moved to the point where the voltage corresponds to the predetermined value of resistance. In the present invention, a field effect transistor is used as the variable part of the resistance, the voltage at the given point being used to create a control voltage on the control (i.e., gate) electrode of the FET to make its drain to source resistance such that the voltage at the given point assumes a given fixed value. This control voltage is maintained while one or more voltages are successively applied across the resistance, thus making the corresponding voltages at the given point ratios of the succeeding voltages across the resistance, to the voltage thereacross when the FET's control voltage was set.

The above-identified Mitchell application discloses determining moisture content of paper by measuring radiation transmitted through the paper. In essence, three beams of radiation coming from the paper, each at a different wavelength, are sensed one after the other, the intensity of each being measured as it is sensed. The wavelengths are so chosen that the negative of the natural logarithm of the ratio $T_A$ of the intensity of one beam to the intensity of the second, diminished by the value of a function $f$ of the ratio $T_R$ of the intensity of the remaining beam to the intensity of said second beam, and then divided by the value of a function $g$ of said ratio $T_R$, is a measure of moisture content C, $T_A$ and $T_R$ being positive numbers less than unity, and $lnT_A$ being a negative number.

Turning to the drawings:

FIG. 1 is a diagram of the system disclosed in the above-identified application, and incorporating computing circuitry according to the present invention;

FIG. 2 is a graphical illustration of a gating sequence involved in the operation of the system of FIG. 1;

Figures 1, 2:
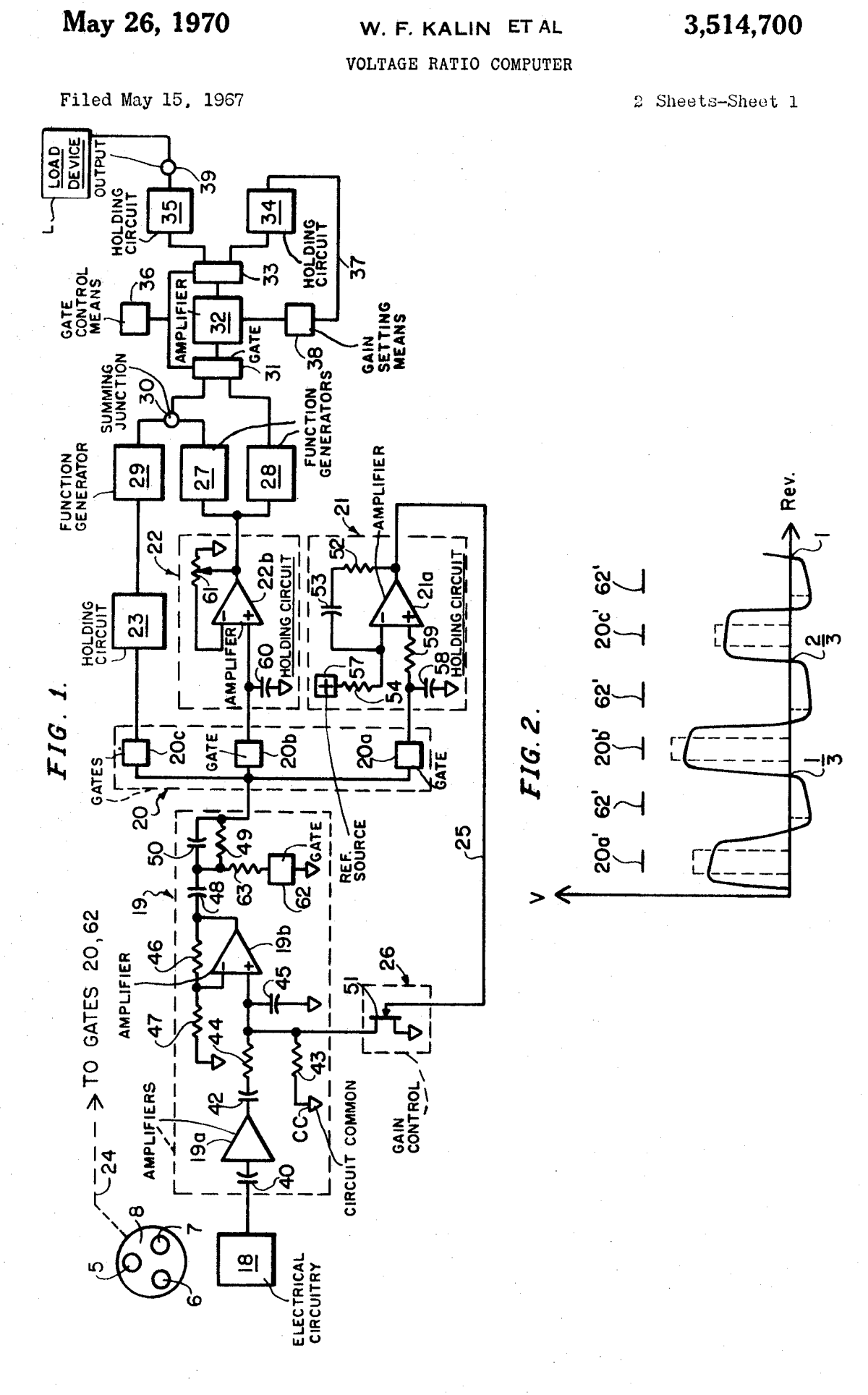
Figure 4:
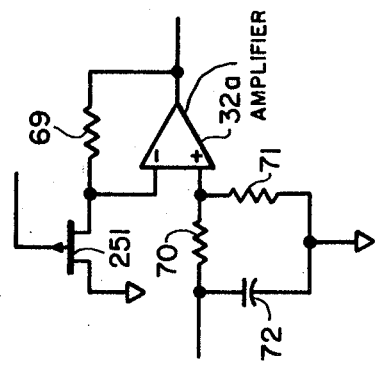
FIG. 4 is a partial illustration of a modification of the computing circuitry according to the invention.

In FIG. 1, disc 8 is the filter disc of the above-identified Mitchell application, having the three filters, 5, 6 and 7 mounted thereon. The filters, in 5, 6 and 7 order, pass through a beam of radiation, and transmit different wavelengths (actually narrow spectral bands). The filtered radiation is projected on a sheet of paper, and those portions thereof which emerge from the paper are detected by suitable means providing an output corresponding to the intensity of the detected radiation, this output being transformed by suitable means, such as electrical circuitry, represented by box 18 into signals preferably electrical quantities such as voltages, whose magnitudes are proportional to said intensities, and which are suitable for use in the system about to be described.

The system will first be described in terms of a box diagram (using the same reference numerals as used in describing the corresponding box diagram of FIG. 6, said Mitchell application).

According to FIG. 1, the output signal of circuitry 18 is applied first to an amplifier 19, and thence, via a gate 20, to holding circuits 21, 22 and 23. Gate 20 is under control of disc 8, which operates suitable gate control means symbolized by a dashed line 24.

In a typical case in practice, disc 8 is rotated at a uniform rate of 800 revolutions per minute. Hence, in each revolution, each filter is in the radiation path for part of a 25 millisecond interval. The dimensions of disc and filters and the radial and angular positions of the filters are such that in each revolution not more than one filter is wholly or partly in the path of the radiation in a continuous interval, of 25 milliseconds of revolution. Hence, gate control means 24 is constructed to control gate 20 in synchronism with the disc 8 so that in one 25 millisecond interval, gate 20 passes voltage to holding circuit 21 only; in the next such interval, to holding circuit 22 only; in the next such interval, to holding circuit 23 only, and such that in each such interval only one filter determines the output of circuitry 18. Supposing the filters to have passed in 5, 6 and 7 order, then holding circuit 21 receives voltage affected by filter 5 only, circuit 22 receives voltage affected by filter 6 only, and holding circuit 23 receives voltage affected by filter 7 only. Since disc 8 rotates exactly once in 75 milliseconds, the next revolution of disc 8 repeats the described gating sequence, and so on, as long as disc 8 rotates.

Holding circuits 21, 22 and 23 may be of known construction whose basic design is to charge a capacitor to the magnitude of a voltage applied to the circuit, and which includes suitable means such as an electrometer amplifier which transforms said voltage into a corresponding current or voltage signal without appreciably discharging the capacitor, which in turn is a good quality, low leakage capacitor that can hold its charge for a sufficient time (on the order of 75 milliseconds, in this case) without substantial dissipation thereof by leakage, in the absence of a charging source. In short, each holding circuit is charged (or discharged) to the voltage output of amplifier 19 once for each revolution of disc 8. It will therefore be seen that the voltages held by circuits 21, 22 and 23 are respectively a voltage proportional to three different beams of radiation produced by filters 5, 6 and 7, respectively, and attenuated by passage through paper.

For performing division, the output of holding circuit 21 is fed back to amplifier 19 in such fashion as to set amplifier gain at a value that causes said output to be maintained at a predetermined constant value, as by operating a gain control 26 of amplifier 19, control 26 being adapted to hold amplifier gain at a value always corresponding to the feedback from holding circuit 23. In this way, the voltages held by holding circuits 21 and 22 become proportional to $T_A$ and $T_R$, respectively.

A pair of function generators 27 and 28 each receives the output of holding circuit 22, and are constructed and arranged to convert this output to signals representative of $f(T_R)$ and $g(T_R)$ respectively.

A function generator 29 receives the output of holding circuit 23 and converts this output to a signal representative of $lnT_A$.

A summing junction 30 receives the $lnT_A$ signal and the $f$ signal, and is designed to diminish the magnitude of the $lnT_A$ signal by the magnitude of the $f$ signal. Consequently, junction 30 provides the numerator of Equation 2 and the $g$ signal from function generator 28 is, of course, the denominator thereof.

Numerator and denominator signals are applied via a gate 31 to an amplifier 32 which in turn produces corresponding output signals, and via a gate 33, applies them to one or the other of a pair of holding circuits 34 and 35, these last being like holding circuits 21, 22 and 23.

Gates 31 and 33 are under control of a gate control means 36 (which may control these gates independently of the control of gate 20). Specifically, gates 31 and 33 are so controlled as (1) to pass the denominator signal to amplifier 32 and the corresponding output of the latter to holding circuit 34 or (2) instead, to pass the numerator signal to amplifier 32 and the corresponding output of the latter to holding circuit 35. These two gating states are mutually exclusive and are caused to exist alternately say at a rate of 60 cycles per second.

The output of holding circuit 34 is fed back via a feedback loop 37 to a gain setting means 38 which sets the gain of amplifier 32, in accordance with the manner in which the gain of amplifier 19 is set by feedback from holding circuit 21. Thus, the dividing action by which $T_A$ and $T_R$ were obtained now provides C, as given in Equation 2, in the form of the ouput from holding circuit 35, available at the output 39 of holding circuit 35, and to which output there may be connected load device L, such as a recorder, meter, controller, alarm, or the like conventional entity useful in the control and/or indication, etc.

Variable gain amplifier 19 includes a pair of amplifiers 19a and 19b of fixed gain, the former being a preamplifier sufficiently linear and wide in bandpass to amplify the pulse-type signals from circuitry 18 to preserve the relative magnitudes of the pulses, while providing sufficient fixed gain that its output signal is high enough to allow attenuation thereof for purposes of division, as will be seen. The pulse signals are applied to amplifier 19a via a coupling capacitor 40 and in response, amplifier 19a produces a corresponding pulsating voltage which is coupled by a capacitor 42 to a voltage divider comprising resistors 43 and 44 in series. The junction of resistors 43 and 44 is connected to the positive terminal (indicated by the plus within the amplifier symbol) of amplifier 19b and to one side of a capacitor 45 whose other side is connected to circuit common (shown here and elsewhere in the figure as an inverted triangle).

Amplifier 19b is a standard off-the-shelf operational amplifier and has its gain set to some suitable fixed value by feedback resistors 46 and 47 connected as shown, that is, its outppt voltage fed back to its negative terminal (indicated by the minus sign in the amplifier symbol) opposes the voltage at the positive terminal producing the output voltage.

The output voltage of amplifier 19b is coupled via capacitors 48 and 50 and resistor 49 (connected as shown) to gate 20, which in reality is three separate gates 20a, 20b and 20c, these latter gates corresponding to the gating properties ascribed to gate 20 earlier above. Gate 20a passes the voltage to the holding circuit 21 which operates the gain setting means 26, here shown as an N-type field effect transistor (FET) 51 whose drain and sink are connected across resistor 43, and whose control electrode is connected to the output of holding circuit 21. The output of holding circuit 21 is that of an amplifier 21a identical to amplifier 19b, except for the external circuitry now to be described. Amplifier 21a has a feedback loop and reference input circuit consisting of a resistor 52, capacitor 53 and resistor 54 connected in series between amplifier output and positive voltage source 57, capacitor 53 and resistor 4 also connecting to the amplifier's negative input terminal. This input and feedback circuitry is so proportioned that amplifier output controls drain-to-source resistance of FET 51 so as to vary the DC resistance between circuit common and the junction of resistors 43 and 44. The drain-to-source resistance of the FET varies from a very high value in megohms to values on the order of that of resistance 43 (e.g., 20,000 ohms), and less. Accordingly, the effective resistance between the junction of resistors 43 and 44 and circuit common varies from substantially the DC resistance of resistance 43 to a predetermined lesser value. The control voltage output of amplifier 21a sets the said effective resistance to a value such that voltage applied to the negative terminal of amplifier 21a is always equal to the reference voltage of source 57. In so doing, the control voltage on the gate electrode of the FET varies from some negative value to substantially zero.

Gate 20a is connected to the junction of a capacitor 58 and a resistor 59, connected in series between circuit common and the positive terminal of amplifier 21a. Capacitor 58 is a memory capacitor, that is, a good quality, low-leakage capacitor, that can hold a charge well when disconnected from the source of charge. Capacitor 53, which has an integrating effect, is provided in order to increase overall stability of which holding circuit 21 forms a part.

Holding circuit 22 includes an amplifier 22b provided with a memory capacitor 60, and a feedback potentiometer 61, connected between amplifier output and circuit common, with its slider connected to the negative input of amplifier 22b, and set to give some convenient fixed value of gain. The arrangement is more or less the same as in the case of holding circuit 21, but without the provision of a fixed reference voltage, the circuit operating to produce an output voltage representative of the voltage across memory capacitor 60. Holding circuit 23 is identical to holding circuit 22, and is therefore not illustrated in detail.

FIG. 2 illustrates the wave form of the voltage pulses produced by filters 5, 6 and 7, respectively, at the output of amplifier 19b, for one revolution of disc 8. It is apparent, in each ⅓ of a revolution, that about half the time the radiation detector (not shown) is seeing the disc space between filters, which space is not producing any sensible radiation to speak of. Due to the AC coupling from circuitry 18 into amplifier 19, the voltage pulses have no definite base line and, indeed, the output of amplifier 19b goes slightly negative when the filters pass from the view of the detector. To provide a base line, a gate 62 clamps the junction of capacitors 48 and 50 to circuit common via a resistor 63, when the gate is operated.

Operation of gate 62 is synchronized by disc 8 in a manner indicated by the line segments 62' in FIG. 2. The line segments define the time intervals during which gate 62 is clamping resistor 63 to circuit common, thereby discharging capacitors 48 and 50. At all other times, the gate effectively disconnects resistor 63 from circuit common. It will therefore be apparent that the capacitors 48 and 50 charge up from the potential of circuit common, rather than from some other indeterminate level.

FIG. 2 also illustrates the operation of gates 20a, 20b and 20c by line segments denoted by the corresponding primed reference characters. Thus, each such gate passes a voltage to its respective holding circuit only during the time corresponding to the line segments. As a result, the leading and trailing edges of each pulse are clipped away so that what remains is a pulse corresponding to maximum radiant energy transmission from the filters.

As a result of the above-described gating action, the voltages passed by gate 20 to the holding circuits actually have the form indicated in dashed line in FIG. 2. Hence, by the inherent property of the holding circuits, their memory capacitors charge or discharge, as the case may be, to very nearly the maximum values of these voltages.

Recalling that the basic consideration is to set the gain of amplifier 19 to a value such that the voltage across capacitor 58, however the input to amplifier 19a may vary, is always caused to attain the same constant value (1 volt, say), as determined by source 57, then any difference between the voltage gated via gate 20a must cause amplifier 21a to provide an output voltage that will change the source-drain resistance of FET 51 in such amount and sense as to change the voltage at the junction of resistance 43 and 44 in a sense and amount to that which will reduce said difference to substantially zero. That is, the input to the positive terminal will change by such amount and such sense as to produce an output that will charge the capacitor 58 to substantially the reference value. This process occurs once for each revolution of disc 8, and during the next two-thirds revolution, the memory property of holding circuit 21 will keep the conductivity value of FET 51 the same as it was during the next preceding third of a revolution. Accordingly, the signals gated in the said two-thirds revolution to holding circuits 22 and 23, one after the other, will be amplified at the gain of amplifier 19 set during the next preceding third of a revolution. Therefore, the outputs of the last said holding circuits will be $T_A$ and $T_R$ respectively.

The voltages gated to holding circuits 21 and 22 may be defined as $$V_{21} = KV_1 \quad (1a)$$
$$V_{22} = KV_2 \quad (1b)$$

where $V_1$ and $V_2$ are consecutive voltages applied between the ends of the net series resistance defined by resistors 43 and 44, and the FET 51. The fraction K of $V_1$ (or $V_2$) applied to amplifier 19b from the junction of resistors 43 and 44, is given by $$K = \frac{R}{R_{44} + R} g \quad (2)$$

where $g$ is the gain (as determined by resistors 46 and 47) of amplifiers 19b, $R_{44}$ is the resistance of resistor 44, and $$R = \frac{R_{43} R_{ds}}{R_{43} + R_{ds}} \quad (3)$$

where $R_{43}$ is the resistance of resistor 43 and $R_{ds}$ is the drain to source resistance of FET 51.

Since $V_{21}$ is maintained constant, and K is set once each revolution of disc 8 and stays the same during such revolution, Equation 1a can be divided into Equation 1b to eliminate K, giving $$V_{22} = \frac{V_2}{V_1} V_{21} \quad (4)$$

meaning that $V_{22}$ is a measure of $V_2/V_1$ and therefore of $T_A$. In the same way, it can be deduced that $$V_{23} = \frac{V_3}{V_1} V_{21} \quad (5)$$

where $V_{23}$ is the voltage gated to holding circuit 23 when $V_3$ replaces $V_2$, and provides a measure of $T_R$. Preferably, the voltage of source 57 is fixed at unity, whereby $V_{21}$ will have a fixed value that is substantially unity.

Figure 3:
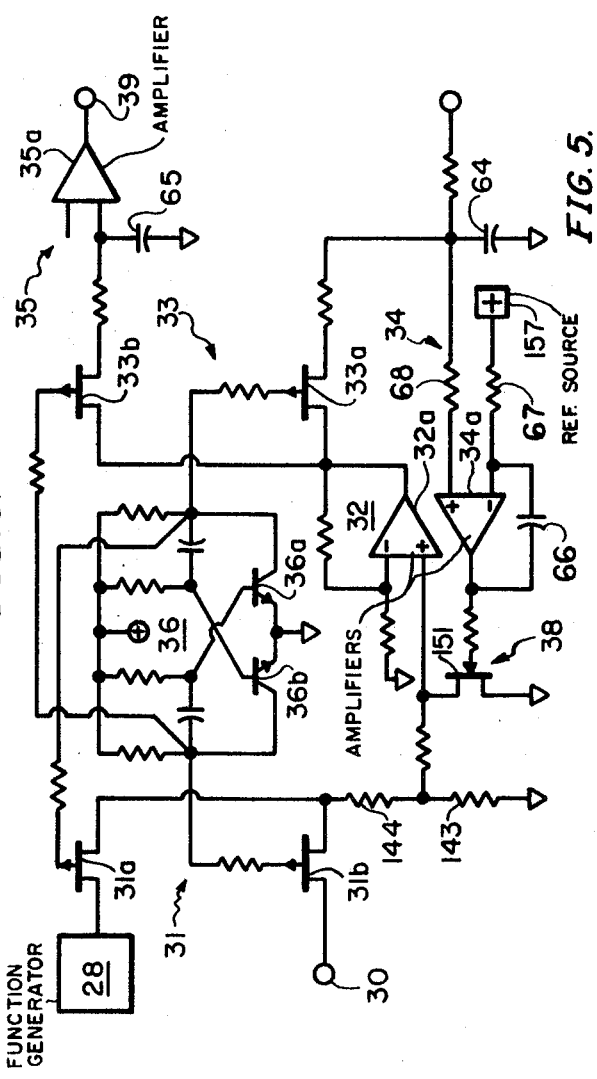
FIG. 3 illustrates computing circuitry that may form part of the system of FIG. 1.

FIG. 3 shows another form of dividing circuitry, with reference to the portion of FIG. 1 consisting of the entities denoted by reference numerals 31 through 38. Thus, the gate 31 comprises a pair of P-type field effect transistors 31a and 31b, the gate 33 comprises a pair of P-type field effect transistors 33a and 33b, and the gate control means 36 comprises a pair of transistors 36a and 36b, together with such circuitry as will define a conventional sort of multivibrator with a square-wave positive pulse appearing alternately at the collectors of the transistors 36a and 36b. It will be evident to one skilled in the art that when gate control means 36 is energized, FET's 31a and 33a will be driven into conduction simultaneously, whereas FET's 31b and 33b will be non-conductive. Thereafter, the latter FET's will be driven into conduction, whereas the former FET's will be non-conductive. This cycle repeats at the frequency of the multivibrator, typically, 60–100 Hz., as long as the latter is energized.

Supposing FET's 31a and 33a to be conducting, then holding circuit 34 has applied thereto the output voltage of amplifier circuit 32. Amplifier circuit 32 corresponds to amplifier 19, but lacks the AC coupling feature of amplifier 19, and, as well, the base line restoration required by such feature. (At this point in the system, the signals are at DC levels suitable for DC transmission.)

The voltage gated by FET 31a is the output of function generator 28, and appears across the voltage divider defined by resistors 144 and 143, corresponding to resistors 44 and 43 of FIG. 1 and, as in the case of the latter, it is the voltage at the junction of resistors 143 and 144 that is amplified.

Holding circuit 34 includes an amplifier 34a, a voltage memory capacitor 64 and a reference voltage source 157, and such other circuitry as is necessary to function like holding circuit 21, FIG. 1, namely: set a voltage on the gate electrode of N-type field effect transistor 151 that makes the voltage output of amplifier circuit 32 equal to the voltage of reference voltage source 157.

When FET's 31b and 33b conduct, FET's 31a and 33a become non-conductive, whereas the drain-to-source resistance of FET remains set at a value determined by the memory capacitor 64. The voltage now applied to amplifier 32a is the output voltage of summing junction 30, more precisely, the fraction thereof appearing at the junction of resistors 143 and 144. This fraction is amplified by amplifying circuit 32.

The output voltage of amplifier 32a is now a measure of the ratio of the voltage of summing junction 30 to the output voltage of function generator 28. This measure is applied to holding circuit 35 at whose output terminal 39, the measure now appears and is maintained there by the memory capacitor 65, when the FET's 31b and 33b again become non-conducting, and the holding circuit 34 once again is gated to the amplifying circuit 32, for resetting the drain-to-source resistance of FET, if the output voltage of function generator 28 has changed since the previous time FET's 31a and 33a were conducting.

In FIG. 3, it will be observed that resistors 144 and 143 form one voltage divider, and resistor 145 and FET 151 form a second voltage divider. This is due to the fact that FIG. 3 is designed from the point of view of use at a stage of the system of FIG. 1 where signal levels are relatively high. Thus, the output voltage of function generator 28 has a range of 0.5 to 5 volts. Resistor 143 is chosen to be about one-tenth the resistance of resistor 144, say 4,700 ohms and 47,000 ohms, respectively. Resistor 145 is accordingly chosen to be 4,700 ohms. The drain-to-source resistance of FET 151 can therefore vary from several megohms to 200 ohms. Consequently, the voltage across the drain-to-source resistance of FET 151 can vary from 18.6 to 455 millivolts. However, it is desirable to keep this last voltage below 25 millivolts. Accordingly, the gain of the amplifier 32 is set to 48 and the reference voltage source 157 is designed to produce a reference voltage of one volt. This prevents the voltage at the junction of the FET 151 and resistor 145 from exceeding about 21 millivolts. This arrangement contemplates that the output voltage from summing junction 30 is in the same range, or a lower range, than that of function generator 28. This is inherently so in the moisture measuring application, and, in any event, could be made so, if necessary by designing the summing junction accordingly, or by attenuating it before application to the voltage divider formed by resistors 143 and 144.

The multivibrator frequency is not critical. Preferably, it is fast enough that changes in the voltages it gates are impressed on the holding circuits rapidly enough as to closely approximate the envelope of the voltages applied to the gate 31, over a large number of gating cycles, though not necessarily for small periods of time corresponding to a few consecutive gating cycles. The memory capacitors are typically five microfarads, and it is tolerable if a few gating cycles are necessary to charge or discharge them to the correct voltages.

It is important, however, that the pulses from transistors 36a and 36b do not overlap in time, though symmetry is not necessary. It is also necessary that FET's 31b and 33b turn off before or simultaneously with turn off of FET's 31a and 33a, and that the former turn on after or simultaneously with turn on of the latter.

Resistors 67 and 68 are 15,000 ohm resistors that, with 0.5 microfarad capacitor 66, stabilize the dividing circuit.

FIG. 4 shows a variant arrangement of the gain control FET, which may be adopted in place of the analogous arrangement of either FIG. 1 or FIG. 2. Here, the gain of the amplifier (say, amplifier 32a), is the sum of the resistance of feedback resistor 69 and the drain-to-source resistance of FET 251, divided by the drain-to-source resistance of FET 251. In a typical case, drain-to-source resistance can vary from 200 ohms to 5 megohms, as before, and resistor 69 would be 200,000 ohms. With this arrangement, the inherent DC offset voltage of the amplifier 29a is multiplied by the gain set by the feedback network, thereby requiring relatively stringent limits on the inherent DC offset voltage. In the present instance, the amplifier 29a would have to be designed to have a long term DC offset voltage of 100 microvolts or less, in order to maintain accuracy of one percent or less in the division circuitry. Thus, for a voltage output range of 0 to 1 volt, gain set by the feedback loop may frequently exceed 100 and the error due to amplification of the offset voltage may exceed 1%, if the DC offset voltage is on the order of 100 microvolts.

In FIG. 3, the gain from the plus terminal of amplifier 32a to its output is fixed, but the gain from gate 31 to gate 33 is variable, the ratio of maximum gain to minimum gain being 25:1. In the case of FIG. 4, however, the corresponding ratio would be on the order of 1000:1.

The lesser range of gain variation is entirely adequate. In speaking of gain, it is to be understood that this is the ratio of voltage at one point in the circuit to another point in the circuit. Thus, the gain from gate 31 to gate 33 is a variable gain for both FIG. 3 and FIG. 4. The gain from the plus terminal of amplifier 32a to gate 33 is a fixed gain, for FIG. 3, but the corresponding gain in FIG. 4 is variable. Similarly, amplifiers 19a and 19b together form the variable gain amplifier 19, whereas considered as separate amplifiers, amplifiers 19a and 19b are fixed gain amplifiers coupled by a variable gain device consisting of resistors 43, 44 and FET 51.

Finally, it will be observed that the AC coupling and base line restoration in amplifier 19 would permit modification in accordance with FIG. 4 without creating the DC offset voltage problem.

The components used in the systems are standard items. For example, the FET's used in gates 31 and 33 may be inexpensive, industrial grade transistors such as 2N2386. With these gate FET's, the multivibrator 36 would be designed to produce alternate outputs of zero and more than 5 volts. FET's 51 and 151 may be Texas Instrument Company TIS14, FET 251 may be 2N2499 and the gate FET's may be 2N2386. For best linearity of the TIS-14, the voltage at the output of gate 31 is designed to be in the range of 2 to 5 volts maximum, hence, the positive pulses of the multivibrator are preferably 15 volt pulses to assure that the switching voltage is always greater than the nominal pinch-off voltage of the gate transistors plus the signal voltage at the gates. All the individual amplifiers (except 19a) may be Nexus A-2's manufactured by Nexus Research Laboratory, Inc., Canton, Mass. This amplifier has an open loop gain of 50,000 to 100,000 and is provided with a pair of input terminals, a circuit common terminal, a positive supply terminal, a negative supply terminal, an output terminal and a pair of terminals across which the slide-wire of a potentiometer may be connected, whose slider is connectable to the positive supply (not shown) for zeroing the output voltage of the amplifier. In the drawings, the circuit common terminals of the amplifiers have been omitted and, as well, the terminals and potentiometers for adjusting output offset voltage. The various illustrated input, output and feedback elements are all external to the amplifiers, being added to suit the present application. Amplifier 19a, moreover, is an emitter-follower needed to match the circuitry 18 to the much lower resistance of the voltage divider formed by resistors 43, 44 (typically 20,000 and 4,700 ohms, respectively) and FET 51, and is therefore not an essential of the invention as claimed.

It is to be observed that the foregoing particulars are merely exemplary of electrical apparatus that is routinely available commercially and/or within the realm of routine design and construction according to principles well-known in the art. The gates, it is to be noted, are in essence but on-off switches serving to make and break connections between the various circuit entities, as needed. Movable contact type switches could be used for gates, but it is preferable to use non-mechanical gates such as the FET gates of FIG. 3.

Figure 5:
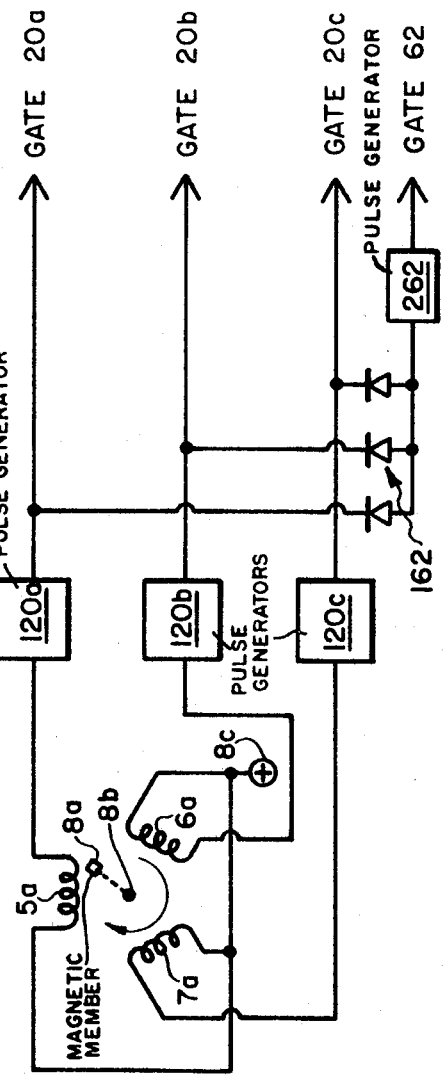
FIG. 5 is a diagram of gate control circuitry providing the gating sequence illustrated in FIG. 2.

In FIG. 5, gate control means 24 is depicted as a magnetic member 8a mounted for rotation about an axis 8b. Conveniently, the member 8a is mounted on the periphery of disc 8, making that axis 8b the axis of rotation of disc 8 (not shown in FIG. 5). Pick-up coils 5a, 5b and 5c are equi-spaced about and closely adjacent to the path of member 8a. One end of each coil is connected to a positive DC voltage source 8c. Therefore, as member 8a rotates, its passing a pick-up coil will generate a pulse therein. Each such pulse is coupled to a corresponding one of pulse generators 120a, 120b and 120c of conventional construction, as for example, monostable multivibrators constructed to produce a more or less square voltage pulse of predetermined duration. As indicated in the figure, these pulses are transmitted to gates 20a, 20b and 20c which respond to same by producing the gating action symbolized by the horizontal line segments 20a' et al., FIG. 2. The gating pulses are coupled through a group of diodes 162 to circuitry 262, which may also be a monostable vibrator, but with a delayed response to pulses received via diodes 162, and producing a pulse that operates gate 62 in the manner symbolized by the line segments 62' of FIG. 2. Roughly speaking, each gate 20 operating pulse will exist for roughly one-half the time interval one of filters 5, 6 and 7 determines the output of circuitry 18, and each gate 62 operating pulse will exist for roughly the other half of such time interval.

While the foregoing disclosure has been in terms of a particular measuring and computing system, our invention as claimed below is of general utility in systems wherein ratios of quantities are to be computed and such quantities are applied sequentially to such system.

Having described our invention in accordance with the statutes, we claim:

1. A ratio computer comprising a first resistance and a second resistance, one end of said first resistance being connected to one end of said second resistance so as to provide a junction, and first input means for applying a first input voltage $V_1$ between the other ends of said resistances so that the voltage at said junction is a fraction K of said first input voltage, said first resistance having, in addition to its said ends, means for applying a control voltage thereto, and being responsive to said control voltage to have a resistance between its ends that varies in accordance with the magnitude of said control voltage; control means constructed and arranged to produce control voltage with a value such that the quantity KV is equal to a predetermined constant; second input means for applying a second input voltage $V_2$ between the said other ends, in place of said first input voltage $V_1$ when $KV_1$ is equal to said predetermined constant, and measuring means for measuring the voltage at said junction, when $KV_1$ is equal to said predetermined constant and $V_2$ is simultaneously applied between the said other ends.

2. The ratio computer of claim 1, wherein said first resistance includes a field effect transistor arranged so that said first resistance comprises the drain to source resistance of said transistor, and said means for applying said control voltage to said transistor is the gate electrode of said transistor, said gate electrode being connected to said control means so as to have said control voltage applied thereto.

3. The ratio computer of claim 2, wherein said first resistance also includes fixed resistance connected in parallel with said drain to source resistance.

4. The ratio computer of claim 1, including gating means and a voltage memory; said gating means being operable to apply the voltage at said junction effectively to said voltage memory, when $V_1$ is applied between said other ends, but being operable also to instead connect said junction effectively to said measuring means when $V_2$ is applied between said other ends; said voltage memory having the characteristic of producing a memory voltage substantially equal to the last voltage applied thereto; said control means being responsive to said memory voltage to vary said control voltage such that when said voltage of said junction is effectively applied to said memory, the said resistance between the ends of said first resistance varies in such fashion as to cause the said voltage at said junction to have the value of said predetermined constant.

5. A ratio computing system including an AC coupled voltage amplifier, said amplifier having a voltage-variable gain control, a source of first and second DC input voltages, said source having means connecting said source to said amplifier for providing said voltages to said amplifier one after the other in the order named, said amplifier being responsive to said input voltages to produce corresponding first and second output voltages; first and second holding circuits and a gate, said gate connecting said amplifier to said holding circuits for applying said first output voltage to said first holding circuit, and for applying said second output voltage to said second holding circuit; said first holding circuit being responsive to said first output voltage to produce a gain control voltage representative of the deviation of said first voltage from a given value, and there being means applying said gain control voltage to said voltage-variable gain control, said gain control being responsive to said gain control voltage to change the gain of said amplifier in a sense and amount such as to cause said first voltage to substantially equal said given value; said gate having the property of applying only said output voltages to the corresponding holding circuits and only when the corresponding said input voltages are applied to said amplifier, and each said holding circuit including a voltage memory from which can be derived the last voltage applied thereto; said amplifier being coupled to said gate by capacitance, and there being base line restoring means discharging said capacitance after each said input voltage has been applied to said amplifier.

6. The system of claim 5, wherein said amplifier includes a differential amplifier having a pair of input terminals, one such terminal being provided with feedback resistance, one such terminal also having a voltage-variable resistance connected thereto and having a voltage drop thereacross, and one such terminal being connected to said source to have said input voltages applied thereto successively; and voltage-variable resistance being responsive to said gain control voltage to have a resistance corresponding to said gain control voltage, whereby to provide said voltage variable gain control.

7. The ratio computing system of claim 5, including a delayed gating means responsive to said gate's applying an output voltage to a said holding circuit, for discharging said capacitance; said delayed gating means including delay means for causing said delayed gating means to discharge said capacitance after the last said output voltage has been applied to said holding circuit, and prior to said gate's applying a next succeeding voltage, if any, to a said holding circuit, whereby said delayed gating means provides said base line restoring means

References Cited

UNITED STATES PATENTS

| 3,153,733 | 10/1964 | Bolt et al. | 307—241 |
| 3,292,013 | 12/1966 | Golahny | 328—161 XR |
| 3,386,053 | 5/1968 | Priddy | 307—251 XR |
| 3,387,145 | 6/1968 | Hopkinson | 328—161 XR |

ALFRED E. SMITH, Primary Examiner

U.S. Cl. X.R.

328—161; 235—196

PO-1050
(5/69)

UNITED STATES PATENT OFFICE
CERTIFICATE OF CORRECTION

Patent No. 3,514,700           Dated 5/26/70

Inventor(s) W. F. Kalin et al

It is certified that error appears in the above-identified patent and that said Letters Patent are hereby corrected as shown below:

Column 2, line 26 should read -- ry represented by box 18, into signals, preferably electrical --.
Column 3, line 9, delete "a voltage";
Column 3, line 19, "23" should be -- 21--;
      , line 20, "21" should be -- 23 --;
      , line 33, after "2" read -- of the above-identified Mitchell application --; line 55, after "in" read -- the aforesaid".
Column 4, line 8, "outptt" should be -- output --;
      , line 28, "4" should be -- 54 --.
Column 5, in equation (2), "g" should be -- G --;
      , line 66, "g" should be -- G --.
Column 6, line 55, after "FET" read -- 151 --.

Signed and sealed this 13th day of July 1971.

(SEAL)
Attest:

EDWARD M. FLETCHER, JR.
Attesting Officer

WILLIAM E. SCHUYLER, JR.
Commissioner of Patents